Sept. 27, 1960　　　E. WITZIG ET AL　　　2,953,949
WORKTABLE
Filed June 29, 1954　　　　　　　　　　　　　2 Sheets-Sheet 1

INVENTORS:
EMIL WITZIG AND
RUDOLF FRANK
BY:

United States Patent Office 2,953,949
Patented Sept. 27, 1960

2,953,949
WORKTABLE

Emil Witzig, Reutlingen, Germany, (Im Kienle 42, Stuttgart, Germany), and Rudolf Frank, Vohrenbach im Schwarzwald, (Am Zuckerberg 41, Ludwigsburg, Germany)

Filed June 29, 1954, Ser. No. 440,164

Claims priority, application Germany June 30, 1953

4 Claims. (Cl. 77—5)

The invention is concerned with a worktable and more especially with a worktable to be used in an apparatus for simultaneously machining several work pieces with the aid of a plurality of tools. Such worktables consist, more particularly when there is question of series production, of a rotatable or swivable table upon which a number of identical work pieces is arranged, and each of said work pieces is once or severally acted upon in each position of said table. Naturally, the removal of the finished work piece and the clamping of the work piece to be machined are hereby also to be looked at as being one of the aforesaid operations. Since the work pieces arranged on the table alter their direction after each rotation of said table, it is necessary for the tools serving to machine said work pieces to be fed in that direction which corresponds to the respective position of the work piece. In order to ensure this feeding of the work pieces in the several different directions, there must be provided a relatively bulky, complicated and expensive mechanism.

It is, therefore, the main object of this invention to provide a worktable of the general character described which makes it possible to very much simplify and lower in price the construction of the mechanism serving to feed and halter the tools.

Another specific object of this invention is to provide a work table by means of which the work pieces can be adjusted independently of the work table carrying the work pieces so as the existent feeding mechanisms for the tools make it necessary.

A further specific object of the invention is to provide a worktable which is so constructed that the work pieces maintain the required position in spite of the rotational movement of the table so that it is possible to manage to operate and halter the tools by means of a few mechanisms simple in construction.

Yet another specific object of this invention is to provide a worktable of the aforedescribed character reliable in service and making very little expenditure of material necessary, and by the use of which an exact adjustment of the work pieces to be machined is ensured.

With these and other objects in view which will appear as the invention proceeds the invention consists of certain novel features of construction as will be particularly pointed out in the appended claims.

The manner of carrying the invention into effect is hereinafter described by way of example, reference being had to the accompanying drawings in which.

Figure 1:
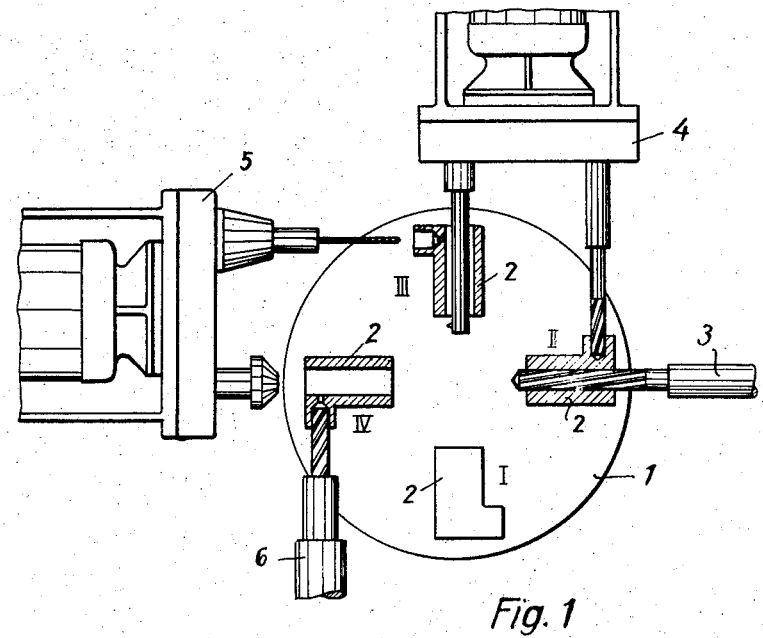
Fig. 1 is a schematical plan view of a known worktable.

In the known worktable as shown in Fig. 1 there are arranged on the rotatable table 1 four work pieces 2 which occupy the positions I to IV. In position I the work piece is placed on the worktable 1 and clamped thereto. In position II a large-sized hole is drilled in the work piece by means of the spindle unit 3, and by means of the spindle head 4 there is drilled in the work piece a small-sized hole arranged rectangularly to the aforesaid large-sized hole.

In position III the large-sized hole is bored with the aid of the spindle head 4, whereas a conduit connecting the small-sized hole with the large-sized one is drilled by means of the spindle head 5. Finally, in position IV the large-sized hole is countersunk with the aid of the spindle head 5 and the small-sized hole is counterbored with the aid of the spindle head 6. Although in this known worktable there are already arranged two tools on a common spindle head, and although these tools serve to simultaneously machine two work pieces occupying two different positions, it is necessary for the tools to be fed in four different directions. Consequently, there must be provided the feeding mechanisms necessary therefor and the corresponding driving means. It will be understood, thus, that in connection with such a worktable a very complicated and expensive driving, feeding and haltering mechanism must be made use of.

Figure 2:
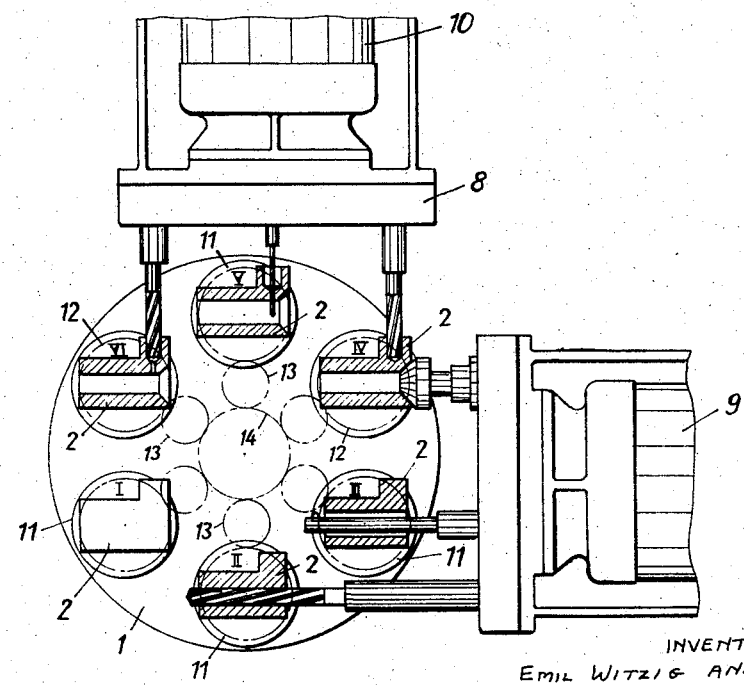
Fig. 2 is also a schematical plan view of a worktable according to the invention.

In Fig. 2 there is shown an embodiment of the invention. On the rotatable worktable 1 there are arranged the work pieces 2 which occupy the positions I to VI. Position I is again that in which the work piece is clamped to the table. In position II the large-sized hole is drilled by means of a drill chucked in the spindle head 7. This large-sized hole is bored in position III with the aid of a tool also held by the spindle head 7. In position IV the large-sized hole is machined by means of a countersinker which is also carried by the spindle head 7. In the same position the small-sized hole is drilled by a drill which is held by a further spindle head 8. The conduit connecting the small-sized hole with the large-sized one is produced in position V, whereas in position VI the small-sized hole is counterbored. The two last named operations are effected also with the aid of tools fixed to the spindle head 8. The spindle heads 7 and 8 are, therefore, constructed as triple-spindle heads and are driven by motors 9 and 10, respectively.

When comparing the new worktable according to Fig. 2 with the known worktable depicted in Fig. 1, it shows that, when the present invention is carried into practice according to its proper sense, there are necessary only two feeding mechanisms with their respective driving appliances in lieu of four of this sort as was hitherto the case. At the same time only relatively few additional features must be provided for the worktable itself. Since these mechanisms generally work automatically, there is also to be noted an important saving of a corresponding number of electrical control mechanisms and switches. It will be also clearly understood that the new worktable according to Fig. 2 occupies less place and is more accessible than the worktable shown in Fig. 1.

As can be seen from Fig. 2 each work piece 2 is arranged on a plate-like bracket 11 which is rigidly connected with a gear wheel 12 arranged coaxially therewith and which meshes with an intermediate gear 13 also mounted on the table 1. On each rotation of the worktable 1 all intermediate gears 13 roll upon a stationary central gear 14 arranged coaxially with the worktable 1. The teeth of the central gear 14, of the intermediate gear 13, and of the gears 12 are preloaded when engaging into one another in order to prevent oscillating movements to take birth during the machining of the work pieces. The brackets for the work pieces can also be clamped in the respective operative position individually or groupedly in order to positively determine the position of the work pieces during machining.

There are cases in which it may be desirable that the work pieces have not the same direction in their different positions but be swivelled with respect to the table through a different, determined angle. To this purpose, the intermediate gears 13 and the gears 12 may be used as change gears so that by employing the suitable gears the desired displacements can be obtained.

The rotatable support for the work pieces, the axis about which the latter rotates, and the frame of the worktable may be constructed and arranged according to the necessities of each case. Therefore, the axis about which the work piece support rotates can be arranged in a perpendicular, horizontal or an optionally inclined plane.

Figure 3:
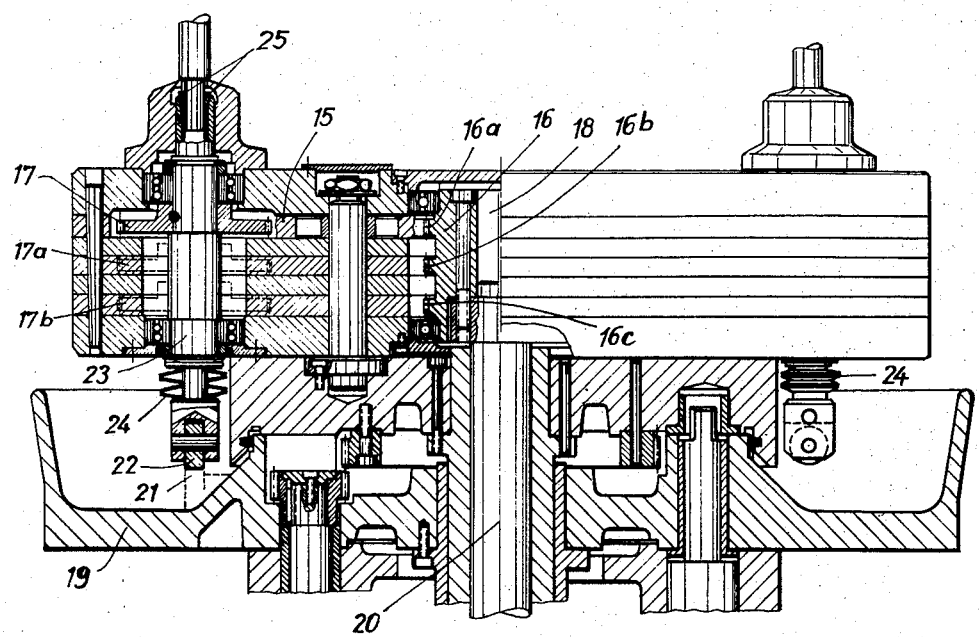
Fig. 3 is a sectional side view of another embodiment of the invention and Fig. 4 is a plan view of the device as shown in Fig. 3.
Figure 4:
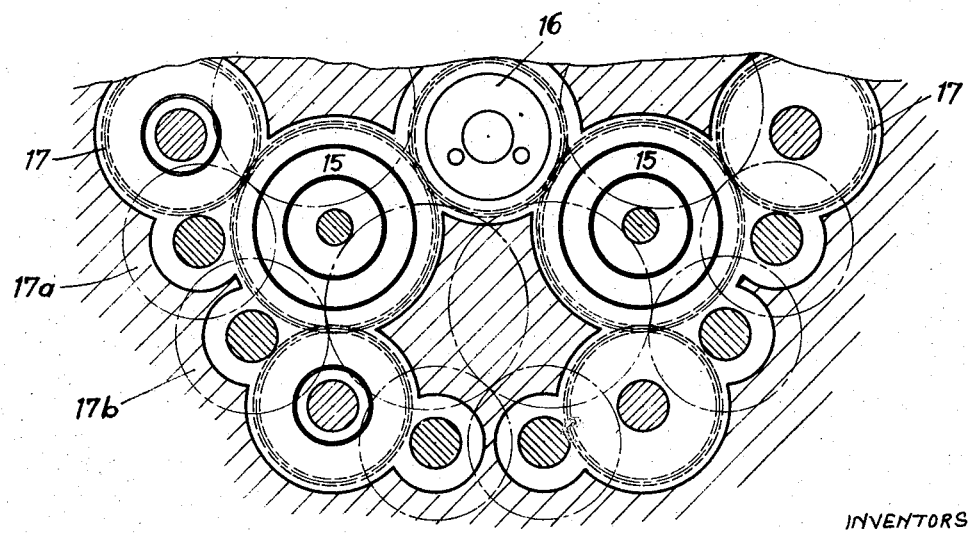

In the embodiment shown in Figs. 3 and 4 the intermediate gears 15, which operatively connect the central gear 16 with the gears 17, 17a, 17b rigidly connected with the brackets for the work pieces, are constructed as toothed rings. Consequently, these intermediate gears can be inserted between the gears with which they mesh after having been somewhat compressed. Then, they yield back so that their teeth are now preloaded when engaging into those of the gears connected with the brackets and of the central gear. By this means, the brackets can be exactly adjusted in a simple manner without much expenditure of material.

In order to be able to arrange a greater number of brackets on the circumference of the worktable, the gears connected with adjacent or neighbouring brackets are arranged at different levels. From Fig. 3 there can be seen that the gear 17a is arranged somewhat lower than the gear 17, whereas the gear 17b is disposed below the gear 17a. The central gear 16, which sits on a fixed axle 18 in the middle of the worktable, has accordingly several rows of teeth—16a, 16b and 16c—spaced from one another, the distance between these rows being the same as that between the levels at which the corresponding gears 17, 17a, 17b are arranged. Naturally, the respective intermediate gears are disposed at a level corresponding to that of the gears cooperating therewith.

In the embodiment depicted in Figs. 3 and 4 the planet-type gearing constituted by the central gears 16, the intermediate gears 15 and the gears connected with the brackets is arranged in combination with a worktable of known type from which it can be removed if desired. This worktable 19 is so arranged as to be rotatable about the stationary axle 20. Thus, the worktable can be used—as necessary in the respective case—in known manner as described in connection with Fig. 1 or by simultaneously displacing or rotating the brackets by means of the aforedescribed planet-type gearing. However, this subdivision of the supporting system has also the advantage that the means for clamping the tools can be controlled by the not moving part of the worktable 19. To this purpose, on the not moving part 19 there are arranged cams 21 which cooperate with rolls 22 on a vertically arranged collet 23 mounted in the respective bracket and able for up and down movement against the action of a spring 24. On the upper end of this collet 23 there are fixed clamping jaws 25 serving to clamp the work piece to the respective bracket. The opening and closing of these jaws 25 is brought about by the up and down movement of the collet 23, which movement is in its turn caused by the cooperative relationship between the stationary cams 21 and the rolls 22 connected with the bracket.

The foregoing description is directed solely towards the constructions illustrated, but we desire it to be understood that we reserve the privilege of resorting to all mechanical changes to which the device is susceptible, the invention being defined and limited only by the terms of the appended claims.

Having thus described the invention, what we claim as new and desire to secure by Letters Patent is:

1. In an apparatus for simultaneous metal-cutting operations such as drilling, reaming or the like on a plurality of workpieces, which operations can be carried out on the workpieces from two different faces at an angle to each other, in combination, support means; a worktable turnably carried by said support means for turning movement about a vertical axis; a plurality of work carrying members distributed about said axis and carried by said worktable for respective turning movement about a plurality of axes parallel to said vertical axis; transmission means interconnecting said worktable and work carrying members for simultaneously turning the latter respectively about said plurality of axes through the same angle that said worktable turns about the axis thereof and in a direction opposite to the direction in which said worktable turns, so that workpieces carried by said work carrying members will extend in the same direction irrespective of the angular position of said worktable and work carrying members; and means for supporting two groups of tools adjacent said worktable for respective rotation about a plurality of axes which are perpendicular to said vertical axis, the tools in each of said groups of tools having axes parallel to each other located in different vertical planes and being adapted to be fed simultaneously toward the work, the angle between the planes of one group of tools and the planes of the other group of tools being equal to the angle between said faces.

2. In apparatus as claimed in claim 1, said transmission means comprising a plurality of gears respectively fixed coaxially to said work carrying members and turntable therewith respectively about said plurality of axes; a stationary gear carried by said support means and coaxial with said vertical axis; and intermediate gear means carried by said worktable in a position between and meshing with said plurality of gears and said stationary gear for turning said plurality of gears and said work carrying members therewith.

3. In apparatus as claimed in claim 2, said intermediate gear means comprising a plurality of ring gears.

4. In apparatus as claimed in claim 2, said intermediate gear means comprising a plurality of resilient ring gears meshing with said stationary gear and with said plurality of gears fixed to said work carrying members, respectively, and said ring gears being compressed between said stationary gear and said gears fixed to said work carrying members so as to resiliently press against the same to eliminate play in the transmission.

References Cited in the file of this patent

UNITED STATES PATENTS

| 398,664 | Sleeper | Feb. 26, 1889 |
| 518,803 | Bohm | Apr. 24, 1894 |
| 892,927 | Bemis | July 7, 1908 |
| 1,297,835 | Guay | Mar. 18, 1919 |
| 1,456,700 | Luhr | May 29, 1923 |
| 1,501,123 | Ljungstrom | July 15, 1924 |
| 1,907,550 | Knowles | May 9, 1933 |
| 2,358,389 | Ewart et al. | Sept. 14, 1944 |
| 2,464,996 | Schafer et al. | Mar. 22, 1949 |